United States Patent [19]

Komai

[11] Patent Number: 5,380,993
[45] Date of Patent: Jan. 10, 1995

[54] PROCESSING SYSTEM FOR COMPRESSING DATA TO REDUCE THE NUMBER OF DIGITS EXPRESSED BY A MICRO-BAR CODE

[75] Inventor: Toshiyuki Komai, Nagoya, Japan

[73] Assignee: Neorex Co., Ltd., Aichi, Japan

[21] Appl. No.: 43,740

[22] Filed: Apr. 7, 1993

[30] Foreign Application Priority Data

Apr. 10, 1992 [JP] Japan ................................. 4-118399

[51] Int. Cl.⁶ .............................................. G06K 7/10
[52] U.S. Cl. .................................... 235/462; 235/470; 235/472
[58] Field of Search ................. 235/462, 375, 467, 472, 235/470, 383, 463; 250/568, 566

[56] References Cited

U.S. PATENT DOCUMENTS

| | | | |
|---|---|---|---|
| 4,621,189 | 11/1986 | Kumar et al. | 235/472 |
| 4,774,500 | 9/1988 | Lichty | 235/432 |
| 4,873,426 | 10/1989 | Sarna et al. | 235/462 |
| 4,945,214 | 7/1990 | Hancock et al. | 235/456 |
| 4,952,785 | 8/1990 | Kikuda | 235/462 |
| 5,065,003 | 11/1991 | Wakatsuki et al. | 235/462 |

FOREIGN PATENT DOCUMENTS 3-152680 6/1991 Japan .
3-196382 8/1991 Japan .

*Primary Examiner*—Donald Hajec
*Assistant Examiner*—Esther Chin
*Attorney, Agent, or Firm*—Wenderoth, Lind & Ponack

[57] ABSTRACT

A micro-bar code data processing system is capable of reducing the number of digits to be expressed by the micro-bar code by compressing information to be contained therein. The micro-bar code data processing system includes a receiver for receiving an original data to be contained in a micro-bar code; a reducer for reducing the number of digits of the original data by compressing the received original data; a converter for converting the compressed data into an encoded micro-bar code data; an outputter for outputting the encoded micro-bar code data; a receiver for receiving encoded data contained in the micro-bar code; a converter for converting the received encoded data into a compressed data; a restorer for restoring the original data from the compressed data by decompression of the compressed data, and an outputter for outputting the restored original data. With such a construction, the number of digits of the data can be reduced by compression of the original data so that the required length of the bar code can be shortened.

9 Claims, 3 Drawing Sheets

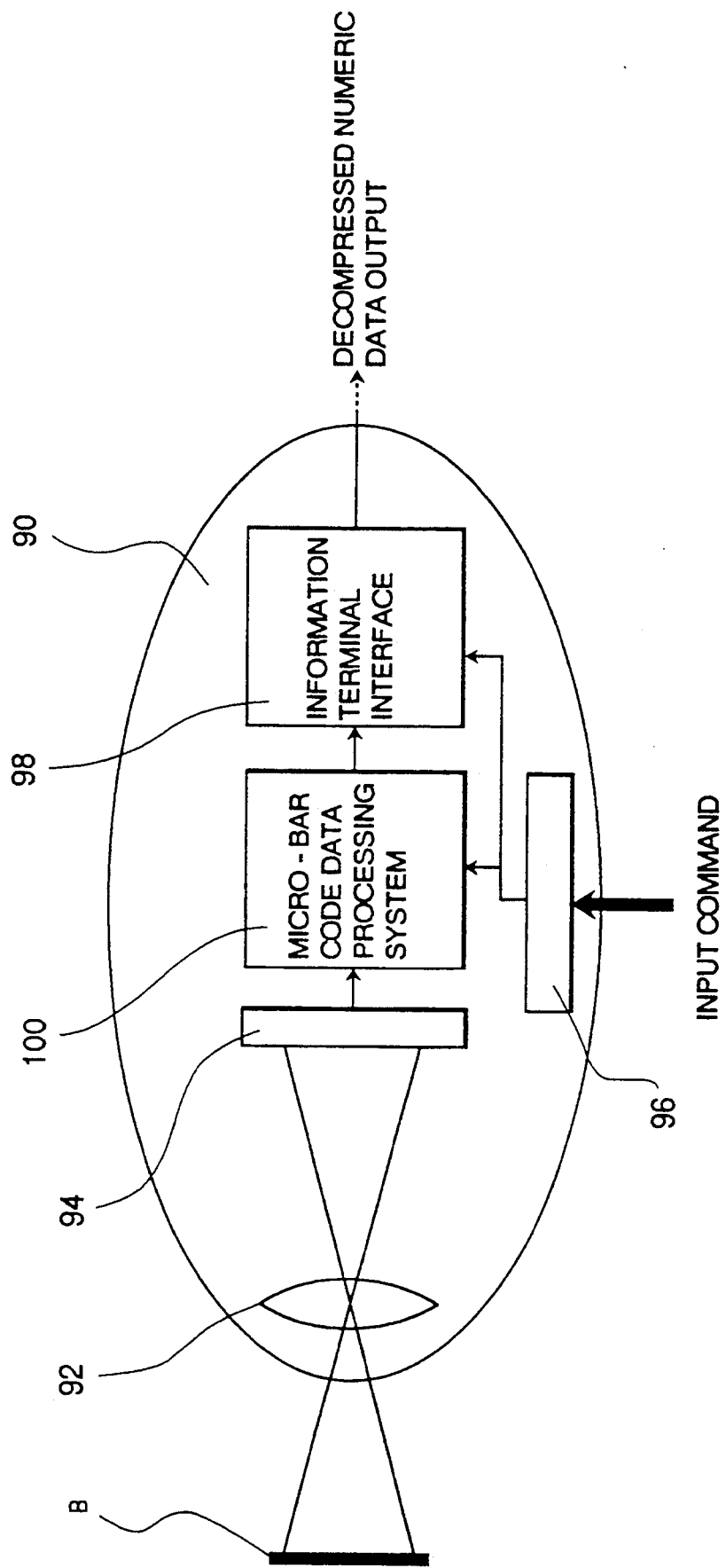

PROCESSING SYSTEM FOR COMPRESSING DATA TO REDUCE THE NUMBER OF DIGITS EXPRESSED BY A MICRO-BAR CODE

BACKGROUND OF THE INVENTION

1. Field of the Invention

The present invention relates generally to a system for compressing and decompressing data contained in a micro-bar code which is much smaller than typically used bar codes. More specifically, the invention relates to a micro-bar code data processing system which can reduce the number of digits of data by compressing data to be contained in the bar code and thus shortening the length of the bar code required for expressing the data.

2. Description of the Related Art

As is well known, a bar code is designed to encode information, such as various characters, such as letters, figures, signs by the combination of a plurality of solid bars arranged in a mutually parallel relationship to one another and blank intervals between the bars (which will be hereafter referred to as white bars). The following four types of bar codes are typically used.

(1) JAN (Japanese Article Number) Code

This coding system has been used for the identification of consumer goods produced in Japan. The JAN coding system is compatible with UPC (Universal Product Code) system used in the United States and the EAN (European Article Number) system used in Europe and Asia. In the JAN coding system, 13 digits of standard code and 8 digits of compressed code are available. The standard JAN code consists of 2 digits of a country code, 5 digits of a product maker code, 5 digits of a product item code and 1 check digit. The compressed code has essentially the same code format as the standard code but has 4 digits of the product maker code and 1 digit of the product item code. In the JAN coding system, only FIGS. 0-9 can be expressed by the combination of the solid bars and white bars. This coding system is convenient for reading since it is not sensitive to the scanning direction of a bar code reader.

(2) ITF (Interleaved Two of Five) Code

The coding system is a standard coding system adapted to physical distribution, which is established by adding a physical distribution identification code of 1 or 3 digits (including 1 leading digit which is normally a 0) to the foregoing JAN code. Therefore, this ITF code may express only FIGS. 0~9. This coding system is successfully used in the field of transportation. In addition, this coding system is employed as data for timed recording of a video tape recorder (VCR). The ITF coding system features a high recording density and a stable information reading precision level even when the bar code is printed on a printing medium having poor printing conditions.

(3) CODE 39

In this coding system, one character is expressed by 9 bars (4 white bars between 5 solid bars). Among 9 bars, 3 bars are thick solid or white bars having greater width. As start and stop codes, an asterisk (*) is employed. This coding system permits one to express FIGS. 0~9, alphabetic letters of A~Z, various signs (e.g., +, −, blank space, /, $, %, .). This coding system has been employed a standard in industrial fields for factory automation. The system used AIAG in the United States automobile industry, and the HIBC system used in United States hospitals and pharmaceutical industry are well known examples of this type of coding system.

(4) NW-7 (CODABAR)

In this coding system, one character is expressed by 7 bars (3 white hams between 4 solid bars). Among seven bars, 2 or 3 bars are thicker bars. As start and stop codes, one of A, B, C and D is used. This coding system is capable of expressing FIGS. 0~9 and various signs (e.g., +, −, /, $, :, .).

In recent years, there have been developed technologies for printing bar codes on various media with substantially high precision and to read such bar codes. According to progress of the technology, the so-called micro-bar code, which is much smaller than typical available bar codes, is coming into practical use. The most thin black bar constituting the micro-bar code is 100 $\mu$m in width and about 1~10 mm in length. Since such micro-bar bar codes can be placed in a space which is too small to put the conventional normal size bar codes, there are various plans to use such micro-bar codes as media for transmission of information in various fields in addition to the physical distribution which has been the primary to of use of the bar codes.

For instance, by indicating a names of manufacturers, article code numbers and production dates of goods on a catalog for remote ordering, the consumers may exactly order the desired goods by reading the information contained in the micro-bar codes by means of a bar code reader system without causing error. Such an arrangement would be particularly useful when the bar code reader system is coupled with other information transmission systems, such as a communication terminal. The micro-bar code representing specific information unique to each article can be considered as a group of bar codes of a necessary number of digits for expressing individual information associated with the article, such as the name of the manufactures or so forth. Therefore, for representing a greater amount of information a , longer length of the micro-bar code is naturally required. Here, it should be noted that throughout the disclosure, the length of the bar code represents a dimension in a direction perpendicular to the black bars from the leading edge of the leading black bar to the trailing edge of the rear end black bar.

on the other hand, in view of reading of the micro-bar code printed on a variation of surfaces such as a newspaper, paperboard or so forth, by means of the bar code reader system, it is desirable to make the width of the black bars as well as the white bars as wide as possible so as to avoid reading error or failure of reading due to printing errors, e.g., blotting, scratching of the ink or so forth. In other words, this means that by containing the information included in the conventional normal size bar code in the micro-bar code, the space for displaying the information can be remarkable reduced, while the precision of reading of the information can be degraded under a condition where the printing quality can fluctuate. Accordingly, it is strongly desired to shorten the length of the micro-bar code without reducing the information to be contained therein. This may be achieved by reducing number of digits to be expressed by the micro-bar code.

SUMMARY OF THE INVENTION

In view of the above-mentioned drawbacks in the art, it is an object of the present invention to provide a micro-bar code data processing system which can reduce the number of digit to be expressed by the micro-bar code by compressing information to be contained therein.

In order to accomplish the above-mentioned and other objects, a micro-bar code data processing system comprises:
- means for receiving an original data to be contained in a micro-bar code;
- means for reducing a number of digits of the original data by compressing the received original data;
- means for converting the compressed data into an encoded micro-bar code data;
- means for outputting the encoded micro-bar code data;
- means for receiving encoded data contained in a micro-bar code;
- means for converting the received encoded data into a compressed data;
- means for restoring the original data from the compressed data by decompression of the compressed data; and;
- means for outputting the restored original data.

With such a construction, the number of digits of the data to be transmitted clan be reduced by compression of the original data by means for reducing the number of digits. Therefore, the number of bars required for expressing the micro-bar code data converted by means for converting into the micro-bar code data can be reduced so that the required length of the bar code for expressing the same information can be shortened.

Also, the encoded micro-bar code data indicative of the compressed data can be decoded by means for converting into the compressed data, and restored as the original data by means for restoring the original data by decompression. Therefore, data processing may be substantially the same as that for the processing of the non-compressed data.

On the other hand, means for reducing the number of digits of the data may comprise:
- means for setting maximum values $A1, A2, A3, \ldots An-1, An$, wherein $A1, A2, A3, \ldots An-1, An$ are positive integers, for respective information items with respect to a plurality of information items are expressed as $a1, a2, a3, \ldots, an-1, an$ wherein $a1, a2, a3, \ldots an-1, an$ are integers not less than zero;
- means for setting an operation parameter m at one of 0 and 1;
- means for calculating $s1, s2, s3, \ldots sn-1, sn$ respectively defined by:

$$s1 = (a1 - m) * (A2 * A3 * A4 * \ldots * An)$$
$$s2 = (a2 - m) * (A3 * A4 * \ldots * An)$$
$$s3 = (a3 - m) * (A4 * \ldots * An)$$
$$\cdot$$
$$\cdot$$
$$sn - 1 = (an - 1 - m) * (An)$$
$$sn = (an - m)$$

- means for deriving the compressed data Ts through $Ts = s1 + s2 + s3 + \ldots + sn - 1 + sn$.

With such a construction, the results of data compression will have a smaller number of digits in comparison with that of the original data (i.e., sum of digit numbers of information items $a1, a2, a3, \ldots an-1, an$). Therefore, the length of the micro-bar code expressing the compressed data can be shortened. In other words, with the unchanged length of the micro-bar code, the width of the black bars and the white bars can be correspondingly increased.

On the other hand, means for restoring the original data from the compressed data comprises:
- means for setting maximum values $A1, A2, A3, \ldots An-1, An$, wherein $A1, A2, A3, \ldots An-1, An$ are positive integers, for respective information items with respect to a sequentially arranged plurality of information items are expressed as $a1, a2, a3, \ldots, an-1, an$ wherein $a1, a2, a3, \ldots, an-1, an$ are integers not less than zero, wherein the maximum valises $A1, A2, A3, \ldots An-1, An$ are known values;
- means for reading in the compressed data Ts derived through compression of the original data consisting of a plurality of information items;
- means for setting an operation parameter m at one of 0 or 1 depending upon the operation parameter m used in a process for deriving said compressed data; and
- means for calculating original values of respective information item in such a manner that processes wherein, by dividing the compressed data Ts with the maximum value An of the lowermost information item to obtain a quotient Ts1 and a remainder an', an original data value of the lowermost information item an is derived by $an = an' + m$, by dividing the quotient Ts1 with the maximum value $An-1$ of the next lower information item to obtain a quotient Ts2 and a remainder $an-1'$, an original data value of the next lower information item $an-1$ is derived by $an-1 = an-1' + m$, are repeated for upper information items in order so that when the quotient becomes zero, the remainder at that time is taken as $a1'$ to obtain an original data value of the uppermost information item by $a1 = a1' + m$.

With such means, the encoded data contained in the micro-bar code and indicative of the compressed data Ts can be restored into the original values of the respective information items $a1, a2, a3, \ldots, an-1, an$. It should be noted that when the quotient in the final calculation by the foregoing means becomes zero the original value of the uppermost information item a1 can be restored by adding m for the quotient in the immediate preceding calculation.

According to another aspect of the invention, a micro-bar code reader system including an image pick-up means for picking upon an image of a micro-bar code, comprises:
- means for receiving an encoded micro-bar code data from the image pick-up means;
- means for converting the received encoded data into a compressed data;
- means for restoring an original data from the compressed data by decompression of the compressed data; and;
- means for outputting the restored original data.

According to a further aspect of the invention, a process for compressing and decompressing a micro-bar code data comprises the steps of:
- a step for compressing an original data, which includes the step of:
  - setting maximum values $A1, A2, A3, \ldots An-1, An$, wherein $A1, A2, A3, \ldots An-1, An$ are positive integers, for respective information items with respect to a plurality of information items are expressed as $a1, a2, a3, \ldots, an-1, an$ wherein a1, a2, a3, ..., an−1, an are integers not less than zero;
setting an operation parameter m at one of 0 and 1;
calculating s1, s2, s3, ... sn−1, respectively defined by:

$$s1 = (a1 - m) * (A2 * A3 * A4 * \ldots * An)$$
$$s2 = (a2 - m) * (A3 * A4 * \ldots * An)$$
$$s3 = (a3 - m) * (A4 * \ldots * An)$$
$$\vdots$$
$$sn - 1 = (an - 1 - m) * (An)$$
$$sn = (an - m);$$

deriving the compressed data Ts through Ts=s1+s2+s3+...+sn−1+sn;
and
a step for restoring the original data from the compressed data including the steps of:
setting maximum values A1, A2, A3, ... An−1, An, wherein A1, A2, A3, ... An−1, An are positive integers, for respective information items with respect to a sequentially arranged plurality of information items are expressed as a1, a2, a3, ..., an−1, an wherein a1, a2, a3, ..., an−1, an are integers not less than zero, and the maximum values A1, A2, A3, ... An−1, An are known values;
reading in the compressed data Ts derived through compression of the original data consisting of a plurality of information items;
setting an operation parameter m the at one of 0 or 1 depending upon the operation parameter m used in a process for deriving said compressed data; and
calculating original values of respective information item in such a manner that processes wherein, by dividing the compressed data Ts with the maximum value An of the lowermost information item to obtain a quotient Ts1 and a remainder an', an original data value of the lowermost information item an is derived by an=an'+m, by dividing the quotient Ts1 with the maximum value An−1 of the next lower information item an−1 to obtain a quotient Ts2 and a remainder an−1', an original data value of the next lower information item an−1 is derived by an−1=an−1'+m, are repeated for upper information items in order so that when the quotient becomes zero, the remainder at that time is taken as a1' to obtain an original data value a1 of the uppermost information item by a1=a1'+m.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a schematic functional block diagram of the preferred embodiment of a micro-bar code reader system, in which the micro-bar code processing system is integrally installed.

DESCRIPTION OF THE PREFERRED EMBODIMENT

Figure 1:
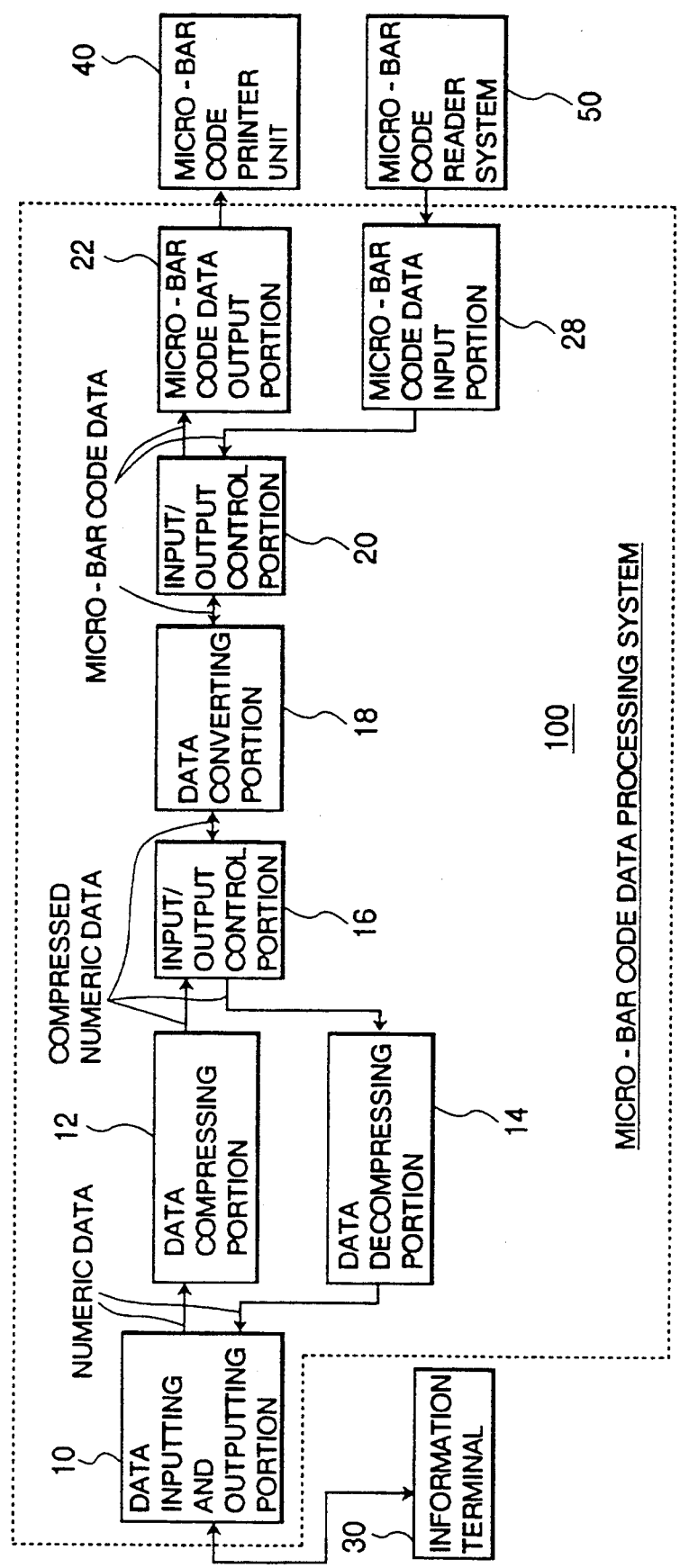
FIG. 1 is a discrete functional block diagram showing one embodiment of a micro-bar code data processing system according to the present invention.

The present invention will be discussed hereinafter in detail in terms of the preferred embodiments with reference to the accompanying drawings. As shown in FIG. 1, the preferred embodiment of a micro-bar code data processing system 100 according to the present invention includes a numeric data input and output portion 10 for inputting and outputting a numeric data signal to be transmitted by means of a micro-bar code; a data compressing portion 12 for compressing the numeric data inputted through the numeric data inputting and outputting portion 10; a data decompressing portion 14 for decompressing the compressed numeric data, a data converting portion 18 for performing conversion between the compressed numeric data and an encoded data expressing the micro-bar code; a micro-bar code data outputting portion 22 for outputting the encoded data to a micro-bar code printer device 40, and a micro-bar code data inputting portion 28 for receiving the encoded data output from a micro-bar code reader system 50. It should be noted that the "numeric data" used throughout the disclosure represents the numeric data of a train of numeric values not only including actual values but can be any other characters, such as alphabetic characters, graphic signs or so forth expressed by numeric codes.

In the practical implementation of the shown embodiment of the micro-bar code data processing system, the numeric data inputting and outputting portion 10 comprises an input and output circuit for a digital pulse signal, which is constituted of a signal level converter circuit, latch circuit or so forth. The numeric data inputting and outputting portion 10 is connected to an external information terminal 30 which is not included in the micro-bar code data processing system 100. The external information terminal 30 may generally be a communication terminal connected to a telephone network. The numeric data outputted from the numeric data inputting and outputting portion 10 and inputted thereto is transmitted as a digital pulse signal through various data processing networks, such as those constituted of other computer systems, via the information terminal 30.

Figure 2:
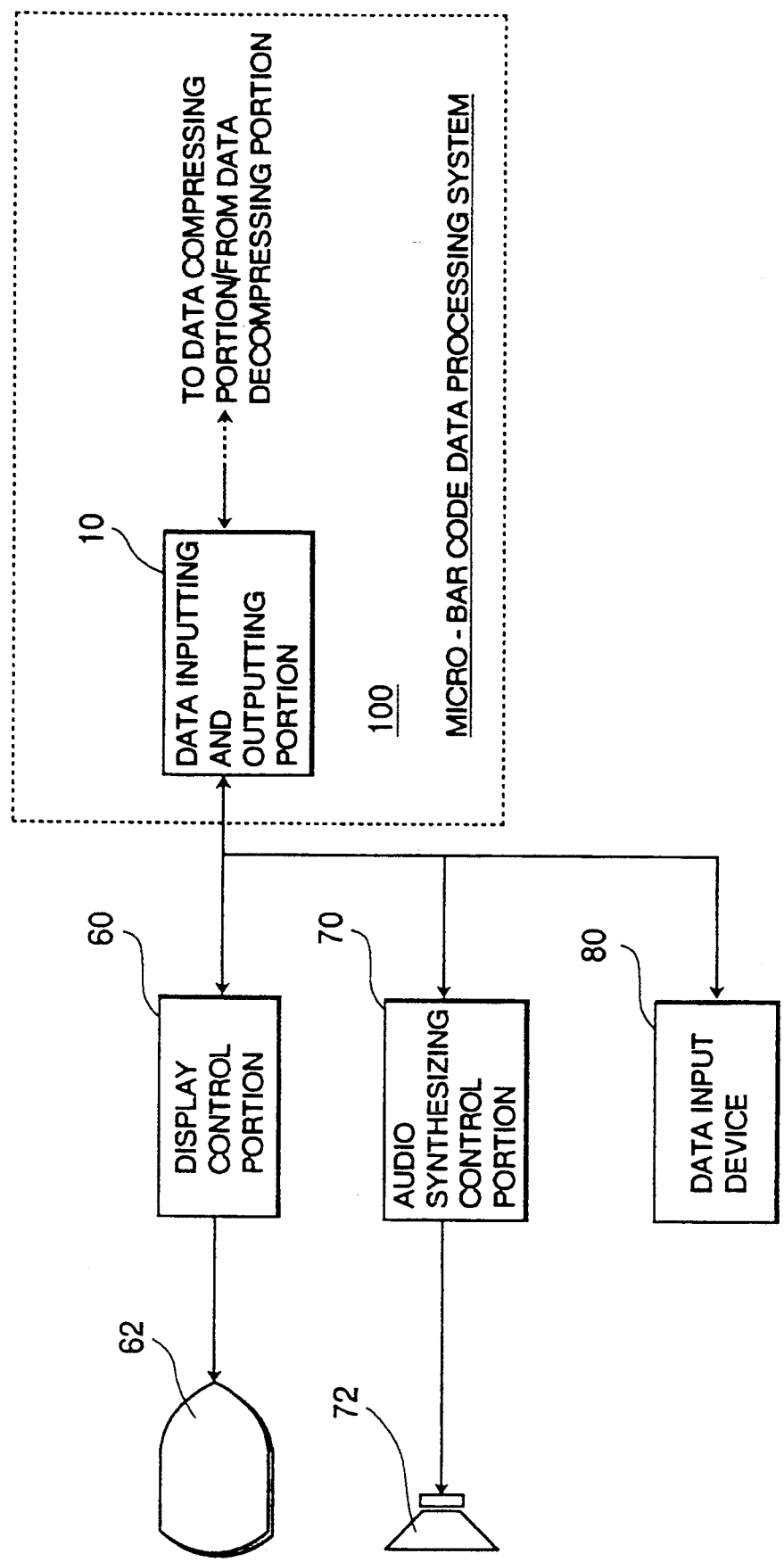
FIG. 2 is a schematic functional block diagram showing a part of another embodiment of the micro-bar code data processing system according to the invention.

In the alternative, as shown in FIG. 2, different from the foregoing embodiment, the output data pulse signal of the numeric data inputting and outputting portion 10 may be visually displayed on a display 62, such as a CRT, a LCD or so forth via a display control portion 60, or audibly reproduced as an audio output from a speaker 72 via an audio synthesizing control portion 70. By extracting the encoded data contained in the micro-bar code in a form of an audible sound, the information contained in the micro-bar code can be exactly transmitted into a telephone network through a normal telephone set.

Also, when a certain numeric data is converted into the encoded data for the micro-bar code employing the shown embodiments of the micro-bar code data processing system 100, a data input device 80 may be directly connected to the numeric data inputting and outputting portion 10. The data input device 80 may comprise a typical keyboard. It is, of course, possible to provide other numeric data converting means within the data input device 80.

The data compressing portion 12 and the data decompressing portion 14 perform the numeric data compression and restoring of the compressed numeric data by decompression respectively, operations of which will be discussed later. In the hardware construction, the data compressing portion 12 and the data decompressing portion 14 can be realized by a digital data processing system including a typical arithmetic CPU, a memory device, such as an IC memory or so forth, storing procedures for compressing and decompressing the numeric data, and peripheral equipment, such as an input/output buffer and so forth, by using the single CPU in a time sharing manner.

The data converting portion 18 is adapted to perform conversion between the compressed numeric data and the encoded data expressing the micro-bar code corresponding to the compressed numeric data. The data converting portion 18 may have substantially the same hardware construction as the foregoing data compressing portion 12 and data decompressing portion 14 and thus includes a typical arithmetic CPU, a memory device, such as an IC memory or so forth, storing procedures for converting between the compressed numeric data and the encoded micro-bar code data, and peripheral equipment, such as an input/output buffer and so forth. When the processing capacity of the CPU and the peripheral equipment permit, the process of data conversion may be included in the process routine of the CPU common to the data compressing portion 12 and the data decompressing portion 14.

The micro-bar code data outputting portion 22 outputs the encoded micro-bar code data generated by the data converting portion 18 to the micro-bar code printer device 40. The micro-bar code data outputting portion 22 includes a signal interface with the printer device 40 and a timing control circuit for controlling transmission and reception timing. The micro-bar code inputting portion 28 comprises an input buffer circuit for receiving encoded data from an external micro-bar code reader system 50.

An input and output control portion 18 controls the input and output of the compressed numeric data between the data converting portion 18, the data compressing portion 12 and the data decompressing portion 14. Also, an input and output control portion 20 controls the input and output of the encoded data between the data converting portion 18, the micro-bar code data outputting portion 22 and the micro-bar code data inputting portion 28.

It should be noted that the shown embodiments of the micro-bar code data processing system 100 according to the present invention may be easily combined with the micro-bar code printer device 40 and/or the micro-bar code reader system 50, as an integral unit. FIG. 3 shows, in a form of a discrete functional block diagram, an example of the integral unit, in which the micro-bar code data processing system 100 according to the present invention is integrally installed in a micro-bar code reader system. A main unit 90 of the micro-bar code reader system includes a focus lens 92, an image pick-up element 94, an input operation portion 96, an information terminal interface 98 and the micro-bar code data processing system 100 of the present invention. The focus lens 92 may be replaced by a plurality of focusing lenses. An image of a micro-bar code B is formed on the image pick-up element 94 by means of the focus lens 92.

The image pick-up element typically comprises a CCD. The output signal of the image pick-up device 94 is received by the micro-bar code data processing system 100, in which a decoding process of the encoded micro-bar code data into the compressed numeric data and the decompression process for restoring an original numeric data from the compressed numeric data are performed. The signal, in which the original numeric data thus restored is contained, is input to the information terminal interface 98 and then output to the information terminal. Alternatively, the output signal may be output to the display means or the audio output means as set forth above. In the further alternative, the output signal containing the restored original numeric data may be input to a printer for printing the data in a form of sequence of figures or character information derived from the numeric data. The output means may also be incorporated in the main unit 90 of the micro-bar code reader system. The input operation portion 96 is adapted to an external manual operation for entry of a micro-bar code reading command and/or a read data converting and outputting command.

Next, the process of compression of the numeric data employed in the shown embodiments of the micro-bar code data processing system 100 of the invention will be discussed in terms of practical examples. It should be noted that, in the following disclosure, the structure and manner of expression of the identification number of goods are mere examples and are not intended to be specific to the scope of the invention.

[EXAMPLE 1]

For the purpose of disclosure, it is assumed that an identification number assigned to a certain goods is consisted of 10 digits of numeric data as a data unit including a kind of goods (a1), a manufacturer (a2), a production date (a3), a production month (a4) and a production year (a5) arranged in this order. These items a1~a5 are respectively expressed by two digits of numeric data. In the shown example, the production year (a5) is expressed as 01~10 so that the lowermost digit of the value of the year can be identified. For instance, the goods produced in 1999 is expressed by a5=09, and the goods produced in 2000 is expressed by a5=10. Here, assuming the number of kinds of the goods is 80 (a1=1~80) which are produced by 30 manufacturers (a2=1~30). Also, the items of date, month and year are respectively expressed as a3 (a3=1~31), a4 (a4=1~12) and a5 (a5=1~10).

Here, a specific example is given for the 57th kind of good (a1=57) of 21st manufacturer (a2=21), and production date of Dec. 1, 1992 (a3=01, a4=12, a5=02). The identification number of the goods is expressed by 10 digits of figures as "5721011202", if it is not compressed. Hereinafter, the processes of data compression and decompression of the numeric data will be discussed in terms of this specific example of the identification number.

(a) Compression Process of Numeric Data

According to the equations set forth above, the compression of the shown example of the numeric data can be expressed as follows. Here, the operational parameter m can be either 0 or 1. However, by setting m=1, the numeric data Ts after compression becomes smaller. Therefore, normally, the operational parameter m for each equation is set at one (1).

s1=(57−1) * 30 * 31 * 12 * 10=6249600
s2=(21−1) * 31 * 12 * 10=74400

$s3 = (1-1) * 12 * 10 = 0$
$s4 = (12-1) * 10 = 110$
$s5 = (2-1) = 1$
$Ts = s1 + s2 + s3 + S4 + S5 = 6324111$

By printing this "6324111" as the bar code, all the information can be described by seven digits which is smaller than the ten digits needed in the conventional codes.

(b) Decompression Process for Numeric Data

Next, manner of reading the bar code indicative of "6324111" and decoding will be discussed. It should be noted that the maximum values of respective of A1, A2, A3, A4 and A5 are preliminarily set in the data decompressing portion 14.

Initially, the compressed numeric data $Ts = 6324111$ is divided by the maximum value of the last item A5, i.e. 10. Namely, it becomes $6324111/10 = 632411$, and a remainder a5′ becomes 1. By adding 1 ($=m$) to this remainder a5′, the original value of a5 ($=2$) can be obtained.

Next, the quotient 632411 is divided by the maximum value of the next item A4, i.e. 12, then $632411/12 = 52700$ and remainder $a4′ = 11$ are obtained. By adding 1 ($=m$) to the remainder a4′, the original value of a4 ($=12$) can be obtained.

Similarly, the quotient 52700 is divided by the maximum value of the next item A3, i.e. 31, then $52700/31 = 1700$ and remainder $a3′ = 0$ is obtained. By adding one to a3′, the original value $a3 = 1$ is obtained.

Also, by dividing the quotient 1700 by the maximum value of the next item A2, i.e. 30, the quotient 56 and the remainder $a2′ = 20$ are obtained. By adding 1 ($=m$) to a2′ ($=20$), the original value $a2 = 21$ can be derived.

Finally, by dividing the quotient 56 by the maximum value of the first item A1, i.e. 80, the quotient 0 and the remainder 56 ($=a1′$) are obtained. By adding 1 to a1′, the original value $a1 = 57$ can be derived.

In the alternative, since the quotient derived with the remainder a2′ is always smaller than 80 (A1), it may be possible to neglect the final division and add 1 to the quotient to obtain the original a1.

From the foregoing process, $a1 = 57$, $a2 = 21$, $a3 = 01$, $a4 = 12$ and $a5 = 02$ can be obtained. Therefore, the original values are successfully restored.

[EXAMPLE 2]

Next, the effect of the data compression and decompression employed in the micro-bar code data processing system according to the present invention will be demonstrated in terms of the case where the identification number of the goods in the foregoing example 1 takes the maximum possible value. For this purpose, it is assumed that the 80th goods (goods number is 80; $a1 = A1 = 80$) is produced by the 30th manufacturer ($a2 = A2 = 30$), on Dec. 31, 2000 ($a3 = A3 = 31$, $a4 = A4 = 12$, $a5 = A5 = 10$). Similarly to the foregoing example 1, the operation parameter m is set to one (1).

(a) Compression Process of Numeric Data
$s1 = (80-1) * 30 * 31 * 12 * 10 = 8816400$
$s2 = (30-1) * 31 * 12 * 10 = 107880$
$s3 = (31-1) * 12 * 10 = 3600$
$s4 = (12-1) * 10 = 110$
$s5 = (10-1) = 9$
$Ts = s1 + s2 + s3 + s4 + s5 = 8927999$ As can be seen, to represent all information, seven digits are required by the micro-bar code data compression and decompression process employed in the system of the invention. Therefore, the number of digits of the numeric data can be reduced by three digits. Therefore, the micro-bar code containing the compressed numeric data requires a shorter length than that containing the non-compressed numeric data.

The exemplary numeric data in the examples 1 and 2 contain values greater than or equal to 1 in each data item. However, in case that one data item ax has a possibility to have the value "0", the maximum value Ax of such data item ax is set at an one greater value than the possible maximum value $ax_{max}$ of the ax ($Ax = ax_{max} + 1$, when the value of the data item is $0 \sim n$, the maximum value to be set becomes $n+1$). In this case, upon calculation of sx with respect to the data item ax, the operation parameter m is set at zero (0). In other words, when a numeric data containing a sequence of data items is compressed in the foregoing manner, an operation parameter m may be set at one (1) or zero (0) according to the attribute of each data item, i.e., whether or not the value of each data item can be zero (0).

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as being limited to the specific embodiment set out above but to include all possible embodiments which can be embodied within a scope encompassed and equivalents thereof with respect to the features set out in the appended claims.

What is claimed is:

1. A micro-bar code data processing system comprising:

means for receiving an original data to be contained in a micro-bar code;

means for reducing a number of digits of said original data by compressing the received original data;

means for converting the compressed data into an encoded micro-bar code data;

means for outputting the encoded micro-bar code data;

means for receiving an encoded data contained in said micro-bar code;

means for converting said received encoded data into a compressed data;

means for restoring the original data from said compressed data by decompression of the compressed data; and;

means for outputting the restored original data;

wherein said means for reducing the number of digits of the data comprises:

means for setting maximum values A1, A2, A2, ... An−1, An, wherein A1, A2, A3, ... An−1, An are positive integers, for respective information items with respect to a plurality of information items are expressed as a1, a2, a3, ... , an−1, an wherein a1, a2, a3 ..., an−1 are integers not less than zero;

means for setting an operation parameter m at one of 0 and 1;

means for calculating s1, s2, s3, ... sn−1, sn respectively defined by:

$$s1 = (a1 - m) * (A2 * A3 * A4 * \ldots * An)$$
$$s2 = (a2 - m) * (A3 * A4 * \ldots * An)$$
$$s3 = (a3 - m) * (A4 * \ldots * An)$$

$$sn - 1 = (an - 1 - m) * (An)$$
$$sn = (an - m)$$

means for deriving the compressed data Ts through

Ts=s1+s2+s3+ ... +sn−1+sn;

and said means for restoring the original data from said compressed data comprises:

means for setting maximum values A1, A2, A3, ... An−1, An, wherein A1, A2, A3 ... An−1, An are positive integers, for respective information items with respect to a sequentially arranged plurality of information items are express as al, a2, a3, ..., an−1, an wherein al, a2, a3, ..., an−1, an are integers not less than zero, and the maximum values A1, A2, A3, ... An−1, An are known values;

means for reading in the compressed data Ts derived through compression of said original data consisting of a plurality of information items;

means for setting an operation parameter m at one of 0 or 1 depending upon the operation parameter m used in a process for deriving said compressed data; and means for calculating original values of respective information items in such a manner that processes wherein, by dividing said compressed data Ts with the maximum value An of the lowermost information item to obtain a quotient Ts1 and a remainder an', an original data value of the lowermost information item an is derived by an=an'+m, by dividing the quotient Ts1 with the maximum value An−1 of the lower information item to obtain a quotient Ts2 and a remainder an−1', an original data value of the next lower information item an−1 is derived by an−1=an−1'+m, are repeated for upper information items in order so that when the quotient becomes zero, the remainder at that time is taken as a1' to obtain an original data value of the uppermost information item by a1-=a1'+m.

2. A system as set forth in claim 1, wherein said means for receiving the original data to be contained in said micro-bar code is connected to an information terminal as a terminal of a communication network including a telephone network.

3. A system as set forth in claim 1, wherein said means for receiving the original data to be contained in said micro-bar code is connected to an original data input means.

4. A system as set forth in claim 1, wherein said means for outputting the restored original data is connected to an information terminal as a terminal of a communication network including a telephone network.

5. A system as set forth in claim 1, wherein said means for outputting the restored original data is connected to a display means for visually displaying the restored original data.

6. A system as set forth in claim 1, wherein said means for outputting the restored original data is connected to an audible signal output means for outputting said restored original data as an audible sound.

7. A micro-bar code reader system including an image pick-up means for picking upon an image of a micro-bar code, comprising:

means for receiving an encoded micro-bar code data from said image pick-up means;

means for converting said received encoded data into a compressed data;

means for restoring an original data from said compressed data by decompression of the compressed data; and means for outputting the restored original data;

wherein said encoded micro-bar code data contains a data compressed through the process of:

setting maximum values A1, A2, A3, ... An−1, An, wherein A1, A2, A3 ... An−1, An are positive integers, for respective information items with respect to a plurality of information items are expressed as a1, a2, a3, ..., an−1, an wherein a1, a2, a3, ..., an−1, an are integers not less than zero;

setting an operation parameter m at one of 0 and 1;

calculating s1, s2, s3, ... sn−1, sn respectively defined by:

$$s1 = (a1 - m) * (A2 * A3 * A4 * \ldots * An)$$
$$s2 = (a2 - m) * (A3 * A4 * \ldots * An)$$
$$s3 = (a3 - m) * (A4 * \ldots * An)$$
$$\vdots$$
$$sn - 1 = (an - 1 - m) * (An)$$
$$sn = (an - m)$$

deriving the compressed data Ts through

Ts=s1+s2+s3+ ... +sn−1+sn.

8. A system as set forth in claim 7, wherein said means for restoring the original data from said compressed data comprises:

means for setting maximum values A1, A2, A3, ... An−1, An, wherein A1, A2, A3, ... An−1, An are positive integers, for respective information items with respect to a sequentially arranged plurality of information items are expressed as a1, a2, a3, ..., an−1, an wherein a1, a2, a3, ..., an−1, an are integers not less than zero, wherein the maximum values A1, A2, A3, ... An−1, An are known values;

means for reading in a compressed data Ts derived through compression of said original data consisting of a plurality of information items;

means for setting an operation parameter m at one of 0 or 1 depending upon the operation parameter m used in a process for deriving said compressed data; and means for calculating original values of respective information item in such a manner that processes wherein, by dividing said compressed data Ts with the maximum value An of the lowermost information item to obtain a quotient Ts1 and a remainder an', an original data value of the lowermost information item an is derived by an=an'+m, by dividing the quotient Ts1 with the maximum value An−1 of the next lower information item to obtain a quotient Ts2 and a remainder an−1', an original data value of the next lower information item an−1 is derived by an−1=an−1'+m, are repeated for upper information items in order so that when the quotient becomes zero, the remainder at that time is taken as a1' to obtain an original data value of the uppermost information item by a1-=a1'+m.

9. A process for compressing and decompressing a micro-bar code data comprising the steps of:

a step for compressing an original data, which includes the steps of:

setting maximum values A1, A2, A3, ... An−1, An, wherein A1, A2, A3, ... An−1, An are positive integers, for respective information items with respect to a plurality of information items are expressed as a1, a2, a3, ..., an−1, an wherein a1, a2, a3, ..., an−1, an are integers not less than zero;

setting an operation parameter m at one of 0 and 1;

calculating s1, s2, s3, ... sn−1, sn respectively defined by:

$$s1 = (a1 - m) * (A2 * A3 * A4 * \ldots * An)$$
$$s2 = (a2 - m) * (A3 * A4 * \ldots * An)$$
$$s3 = (a3 - m) * (A4 * \ldots * An)$$
$$\vdots$$
$$sn - 1 = (an - 1 - m) * (An)$$
$$sn = (an - m)$$

deriving the compressed data Ts through
Ts=s1+s2+s3+ ... +sn−1+sn;

and a step for restoring the original data from said compressed data including the steps of:

setting maximum values A1, A2, A3 ... An−1, An, wherein A1, A2, A3, ... An−1, An are positive integers, for respective information items with respect to a sequentially arranged plurality of information items are expressed as a1, a2, a3, ..., an−1, an wherein a1, a2, a3, ..., an−1, an are integers not less than zero, wherein the maximum values A1, A2, A3, ... An−1, An are known values;

reading in a compressed data Ts derived through compression of said original data consisting of a plurality of information items;

setting an operation parameter m at one of 0 or 1 depending upon the operation parameter m used in a process for deriving said compressed data; and calculating original values of respective information item in such a manner that processes wherein, by dividing said compressed data Ts with the maximum value An of the lowermost information item to obtain a quotient Ts1 and a remainder an′, an original data value of the lowermost information item an is derived by an−=an′+m, by dividing the quotient Ts1 with the maximum value An−1 of the next lower information item to obtain a quotient Ts2 and a remainder an−1′, an original data value of the next lower information item an−1 is derived by an−−1=an−1′+m, are repeated for upper information items in order so that when the quotient becomes zero, the remainder at that time is taken as a1′ to obtain an original data value of the uppermost information item by a1=a1′+m.

* * * * *